United States Patent [19]

Tajima et al.

[11] Patent Number: 4,729,938

[45] Date of Patent: Mar. 8, 1988

[54] OPTICAL DISC BASE PLATE HAVING A PRIMER LAYER FORMED OF AN ULTRAVIOLET-CURED RESIN COMPOSITION

[75] Inventors: Tetsuo Tajima; Hiroaki Miwa, both of Fujisawa; Ryoichi Sudo, Yokosuka, all of Japan

[73] Assignees: Hitachi, Ltd.; Hitachi Maxell Ltd., both of Japan

[21] Appl. No.: 798,244

[22] Filed: Nov. 8, 1985

[30] Foreign Application Priority Data

Nov. 13, 1984 [JP] Japan ................. 59-237418

[51] Int. Cl.$^4$ ............. G03C 1/80; G03C 1/72; B03C 3/02; G01D 9/00
[52] U.S. Cl. .................. 430/272; 430/271; 430/945; 264/22; 346/135.1; 346/76 L; 369/283; 369/284; 369/94; 428/64; 428/65
[58] Field of Search ............ 430/945, 271, 272; 264/22; 346/135.1, 76 L; 369/283, 284, 94; 428/64, 65

[56] References Cited

U.S. PATENT DOCUMENTS

| | | | |
|---|---|---|---|
| 3,520,683 | 7/1970 | Kerwin | 430/272 X |
| 4,199,421 | 4/1980 | Kamada et al. | 264/22 |
| 4,434,429 | 2/1984 | Terao et al. | 346/135.1 |

FOREIGN PATENT DOCUMENTS

| | | | |
|---|---|---|---|
| 3505355 | 8/1985 | Fed. Rep. of Germany ... | 346/135.1 |
| 6127946 | 10/1981 | Japan | 264/22 |
| 0148705 | 11/1981 | Japan | 428/64 |
| 0045952 | 3/1985 | Japan | 369/284 |

OTHER PUBLICATIONS

Chemical Abstracts, vol. 100, No. 6, Feb. 1984, p. 48, Abstract No. 35532k, Columbus, Ohio, USA, of Japanese Laid Open Patent Application, 58-129008 (SUWA Seikosha Co. Ltd.), Jan. 8, 1983.

Primary Examiner—Paul R. Michl
Assistant Examiner—Cynthia Hamilton
Attorney, Agent, or Firm—Antonelli, Terry & Wands

[57] ABSTRACT

An optical disc obtained by placing in parallel two optical disc base plates comprising a transparent substrate, a primer layer formed thereon, and a recording film formed thereon, or the transparent substrate and the primer layer being integrated into one body, wherein the primer layer is made from a special resin composition, is excellent in properties, particularly in moisture resistance.

16 Claims, 10 Drawing Figures

OPTICAL DISC BASE PLATE HAVING A PRIMER LAYER FORMED OF AN ULTRAVIOLET-CURED RESIN COMPOSITION

BACKGROUND OF THE INVENTION

This invention relates to an optical disc base plate, particularly to an optical disc base plate read out by light and used for digital audio discs, optical video discs, memory discs, magnetic optical discs, etc.

Optical discs are formed, for example, by placing oppositely two optical disc base plates comprising a transparent substrate such as a glass plate, a transparent plastic plate, or the like, a primer layer formed on the substrate and having groove-like and hole-like depressions and protuberances for servo tracks, and a metal-made recording film formed on the primer layer using such a metal as Bi, In, Te, As, Pb, Sn or the like, so as to face the recording films each other using a spacer with a predetermined distance, and bonding the spacer and the transparent substrates with an adhesive. Then, the recording film is irradiated with a light beam and the irradiated portion of the metal-made recording film is removed to give information units.

More concretely, such optical discs have been obtained by inserting an ultraviolet-curable resin composition between a stamper made of a metal such as nickel and having predetermined depressions and protuberances, and a transparent substrate, curing the resin composition with ultraviolet light to form a primer layer, taking off the metal-made stamper, forming a metal-made recording film on the primer layer having depressions and protuberances, placing two thus formed optical disc base plates (comprising the transparent substrate, the primer layer and the recording film) oppositely so as to face the metal-made recording films each other using spacers with a predetermined distance, and bonding the spacers to the optical disc base plates.

On the other hand, it has also been known that optical discs can be produced by forming a transparent substrate having a function of primer layer and predetermined depressions and protuberances by using a thick primer layer made from a ultraviolet curable resin composition and omitting a conventionally used transparent substrate, forming a metal-made recording film on the surface of the transparent substrate to give an optical disc base plate, placing two optical disc base plates oppositely so as to face the metal-made recording films each other by using spacers with a predetermined distance and bonding the spacers to the optical disc base plates.

The ultraviolet-curable resin composition used for the primer layer mentioned above should satisfy the following conditions:

(a) The cured product is optically transparent.

(b) The resin adheres well to the transparent substrate made from glass, a transparent plastic, or the like.

(c) The resin is easily peeled from the stamper.

(d) The cured product does not generate a substance corrosive to the metal-made recording film.

(e) Recorded signals can be read out accurately without deforming the metal-made recording film due to moisture absorption even if used for a long period of time.

(f) Thermal stability of grooves with depressions and protuberances on the metal-made recording film obtained by vacuum deposition is excellent without causing changes in grooves' height and shape.

(g) To have mechanical strength enough to withstand a high-speed revolution of 500 rpm or more is necessary.

But conventional ultraviolet-curable resin compositions were not able to satisfy the above-mentioned conditions (a) to (g) at the same time.

A typical example is shown in Japanese Patent Unexamined Publication No. 127946/81.

SUMMARY OF THE INVENTION

It is an object of this invention to overcome the disadvantages of the prior art and to provide an optical disc base plate stable in performance and an ultraviolet-curable resin composition used therefor.

This invention provides an optical disc base plate comprising a transparent substrate, a primer layer formed on the substrate and having depressions and protuberances for carrying information signals, and a recording film formed on the primer layer, said primer layer being obtained by curing with ultraviolet light irradiation a ultraviolet-curable resin composition comprising at least one compound selected from the compounds of the formulae:

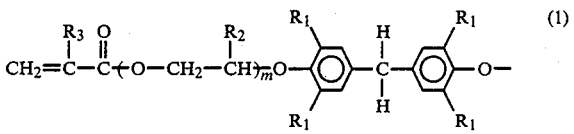

(1)

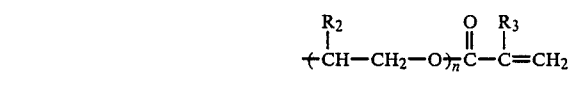

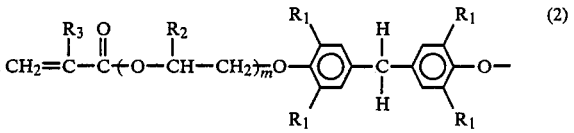

(2)

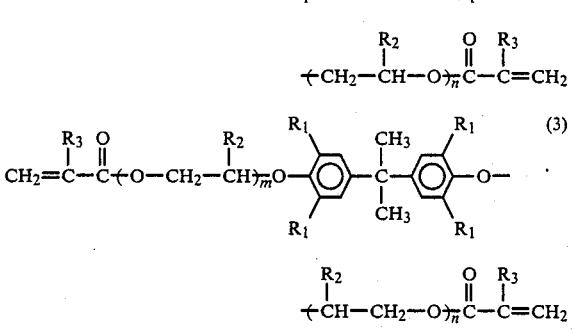

(3)

and

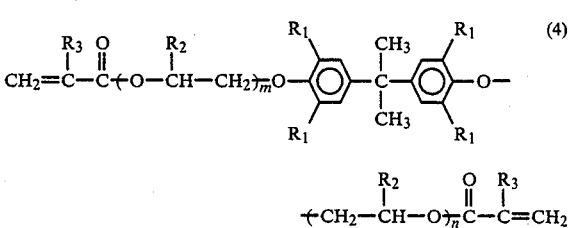

(4)

wherein $R_1$ is hydrogen or a halogen; $R_2$ is an alkyl group having 1 to 12 carbon atoms; $R_3$ is hydrogen or a methyl group; m and n are independently an integer of 1 to 4, and a photopolymerization initiator.

In the above-mentioned optical disc base plate, the transparent substrate and the primer layer can be formed into one body using the ultraviolet-curable resin composition.

This invention also provides an ultraviolet-curable resin composition for producing an optical disc base plate.

DESCRIPTION OF THE PREFERRED EMBODIMENTS

Figure 1:
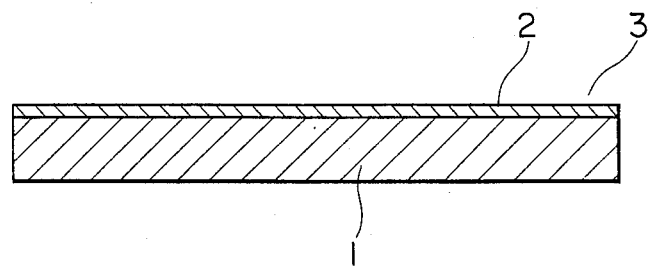
FIGS. 1 to 6 are cross-sectional views of parts of an optical disc for illustrating a production process of an optical disc.

The resin components used in the ultraviolet-curable resin composition are at least one compound selected from the compounds of the formulae:

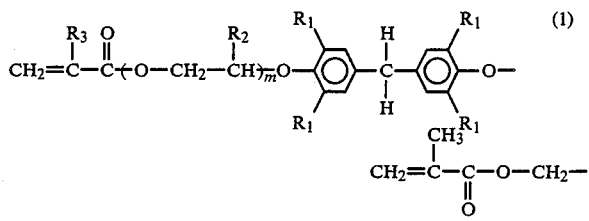

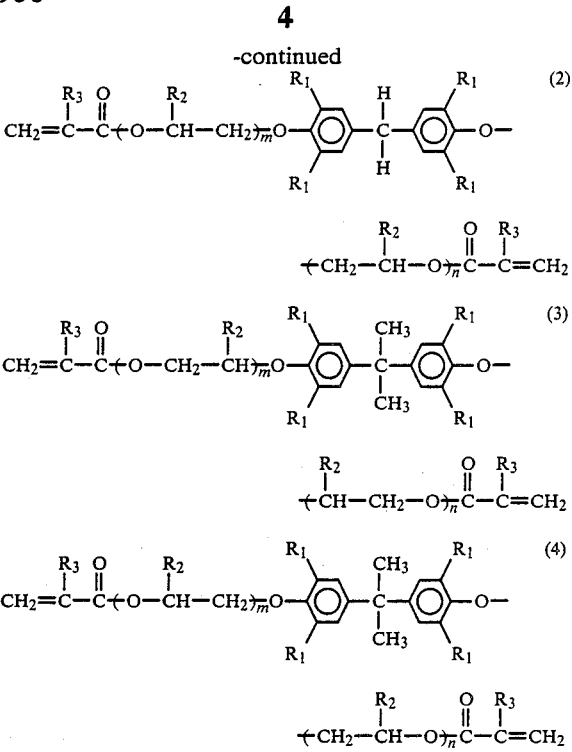

wherein $R_1$ is hydrogen or a halogen; $R_2$ is an alkyl group having 1 to 12 carbon atoms; $R_3$ is hydrogen or a methyl group; m and n are independently an integer of 1 to 4. These compounds can be used alone or a mixture thereof.

Examples of the compound of the formula (1) are

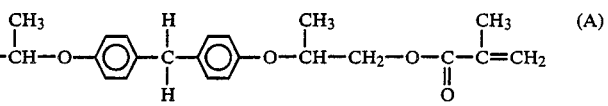

and the like.

Examples of the compound of the formula (2) are

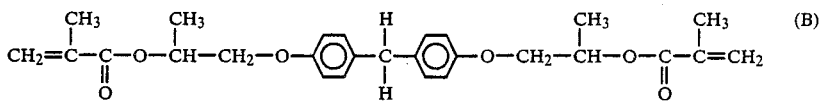

and the like.

Examples of the compound of the formula (3) are

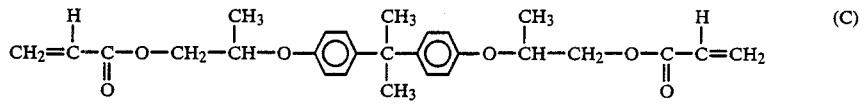

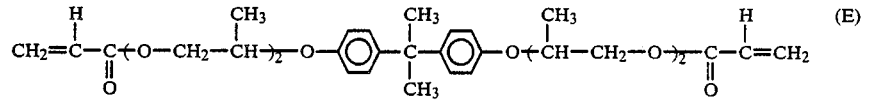

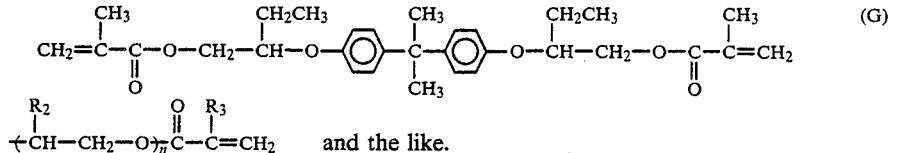

and the like.

Examples of the compound of the formula (4) are

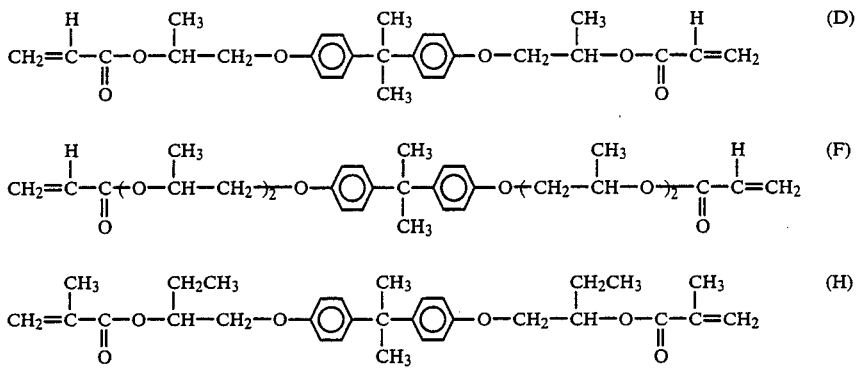

and the like.

The photopolymerization initiator necessary for curing the compounds of the formulae (1) to (4) are as follows:

Benzils such as benzil, etc.

Benzoins such as benzoin, benzoin methyl ether, benzoin ethyl ether, benzoin isopropyl ether, benzoin isobutyl ether, α-methylbenzoin, etc.

Benzophenones such as 1-hydroxycyclohexyl benzophenone, etc.

Acetophenones such as acetophenone, α,α,α-tribromoacetophenone, etc.

Thioxanthones such as 2-chlorothioxanthone, 2-methylthioxanthone, etc.

Antraquinones such as 2-ethylanthraquinone, 2-methylantraquinone, etc.

Benzylketals such as benzyl dimethyl ketal, etc. These photopolymerization initiators can be used alone or as a mixture thereof.

The photopolymerization initiator is preferably used in an amount of 0.01 to 5 parts by weight based on 100 parts by weight of the compound(s) of the formulae (1) to (4).

The ultraviolet-curable resin composition may contain one or more acrylates and/or methacrylates in order to adjust the viscosity, the hardness, and the thermal expansion coefficient, to lower the moisture absorption properties, and to improve the peeling properties of stamper.

Examples of the acrylates and methacrylates are lauryl acrylate, lauryl methacrylate, tridecyl methacrylate, isobornyl acrylate, isobornyl methacrylate, neopentyl glycol diacrylate, neopentyl glycol dimethacrylate, trimethylolethane triacrylate, trimethylolethane trimethacrylate, trimethylolpropane triacrylate, trimethylolpropane trimethacrylate, 1,6-hexanediol dimethacrylate, 1,10-decanediol dimethacrylate, etc.

The acrylates and/or methacrylates are preferably used in an amount of 0 to 40 parts by weight based on 100 parts by weight of the compound(s) of the formulae (1) to (4).

The ultraviolet-curable resin composition may contain one or more silane coupling agents in order to stabilize the adhesive properties of the above-mentioned resin when absorbed moisture.

Examples of the silane coupling agents are γ-acryloxypropyltrimethoxysilane, γ-methacryloxypropyltrimethoxysilane, vinyltrimethoxysilane, vinyltriethoxysilane, N-β-(N-vinylbenzylamino)ethyl-γ-aminopropyltrimethoxysilane.monohydrogenchloride, etc.

These silane coupling agents are preferably used in an amount of 0 to 6.0 parts by weight based on 100 parts by weight of the compound(s) of the formulae (1) to (4).

The ultraviolet-curable resin composition is, for example, poured into a space formed by two glass plates and pressed at a pressure of 2 to 20 g/cm$^2$, preferably 5 to 15 g/cm$^2$ and exposed to ultraviolet irradiation at 50 to 400 mW/cm$^2$, preferably 100 to 250 mW/cm$^2$, using a high-pressure mercury lamp, xenon lamp, or the like to cure the resin composition.

Using the ultraviolet-curable resin composition, plastic information-recording media such as optical discs can be produced according to conventional processes as shown in FIGS. 1 to 6.

For example, as shown in FIG. 1, a photo resist film 2 with a uniform thickness is formed on a surface of a substrate 1 such as a smooth glass plate to give a disc base plate 3.

Figure 2:
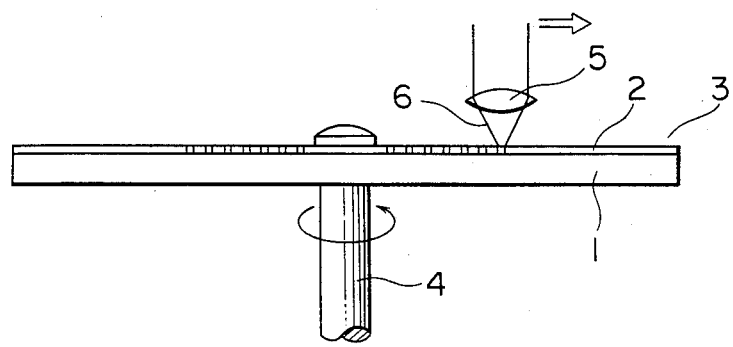

Then, as shown in FIG. 2, the disc base plate 3 is mounted on a spindle 4, rotated and irradiated with a laser light 6 for cutting modulated by predetermined tracking signals on the photo resist film 2, while moving a laser head 5 from an inner side to an outer side of the disc base plate 3.

Subsequently, the photo resist film 2 is subjected to a developing treatment to remove the portions exposed to the laser light 6 for cutting and to produce a recorded base plate wherein grooves for carrying information are formed.

Figure 3:
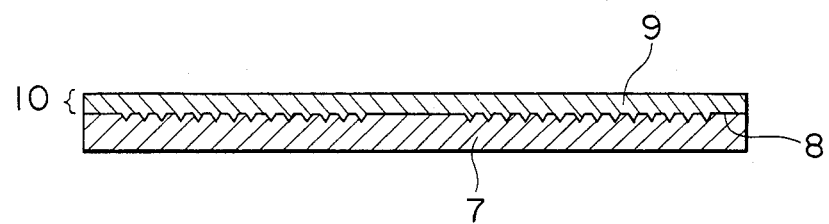

An electroconductive film 8 is formed on the photo resist film 2 of the recorded base plate by vapor deposition of Ni or the like, followed by the formation of an electroformed film 9 using a metallic material such as Ni, or the like on the electroconductive film 8, as shown in FIG. 3. Then, a laminated body of the electroconductive film 8 and the electroformed film 9 is removed from the interface of the electroconductive film 8 and the photo resist film 2 to give a stamper 10.

Figure 4:
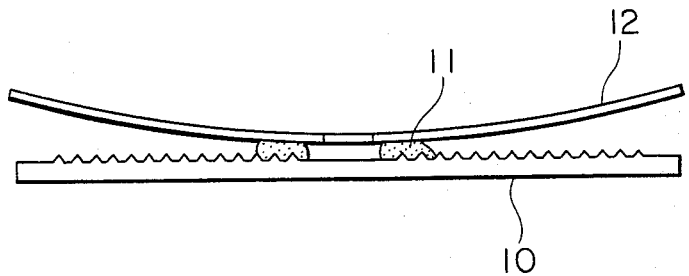

On the transcription side of the grooves of stamper 10, an ultraviolet-curable resin composition 11 for a primer layer is coated as shown in FIG. 4 and the resin composition 11 is stretched uniformly by using a transparent substrate 12 made from glass, plastic or the like.

After curing the resin composition 11 for the primer layer, an integrated body of the primer layer and the substrate is removed from the interface of the stamper 10 and the primer layer resin 11. Then, a recording film 13 made of a metallic material such as Bi, In, Te, As, Pb, Sn, or the like with almost uniform thickness is formed on the surface of the primer layer resin 11 to give an optical disk base plate 14 integrally formed of the recording film 13, the primer layer resin 11 and the transparent substrate 12 as shown in FIG. 5.

Among the material for forming the recording film, there can preferably be used Te series materials such as Te compounds containing Pb, e.g., Te-Se-Pb crystalline chalcogenide (e.g., Te$_{80}$Se$_{10}$Pb$_{10}$), Te-C obtained by plasma codepositing CH$_4$, etc., on Te, Te-CS obtained by plasma codepositing CS$_2$ on Te, TeO$_x$ obtained by plasma codepositing TeO$_2$ and Te, and the like.

Figure 6:
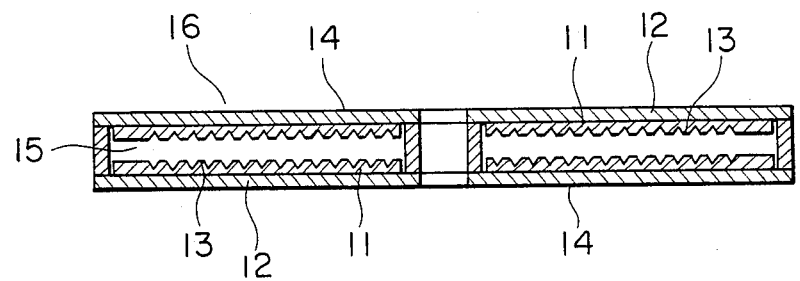

Finally, two optical disc base plates 14,14 are placed in parallel so as to face the primer layer resin sides towards each other and bonded via spacers with a predetermined space 15 between the opposite recording films 13,13, (or via a layer made from a substance having very little thermal conductivity) to give a desired optical disc 16 for recording information as shown in FIG. 6.

Figure 5:
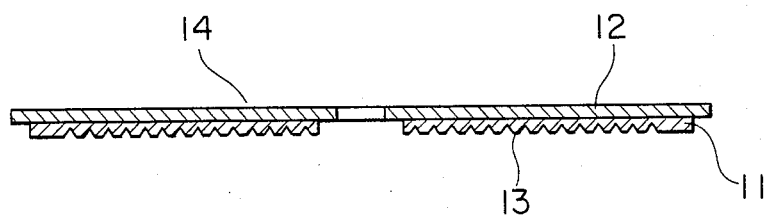

In FIG. 5, the primer layer 11 of the resin composition can be made thick so as to have both the functions of the transparent substrate and the primer layer by removing the transparent substrate 12 to give the optical disc base plate 14.

This invention is illustrated by way of the following Examples.

EXAMPLE 1

As the resin component, the following resins of the formulae (A) to (H), (X) and (Y) were used:

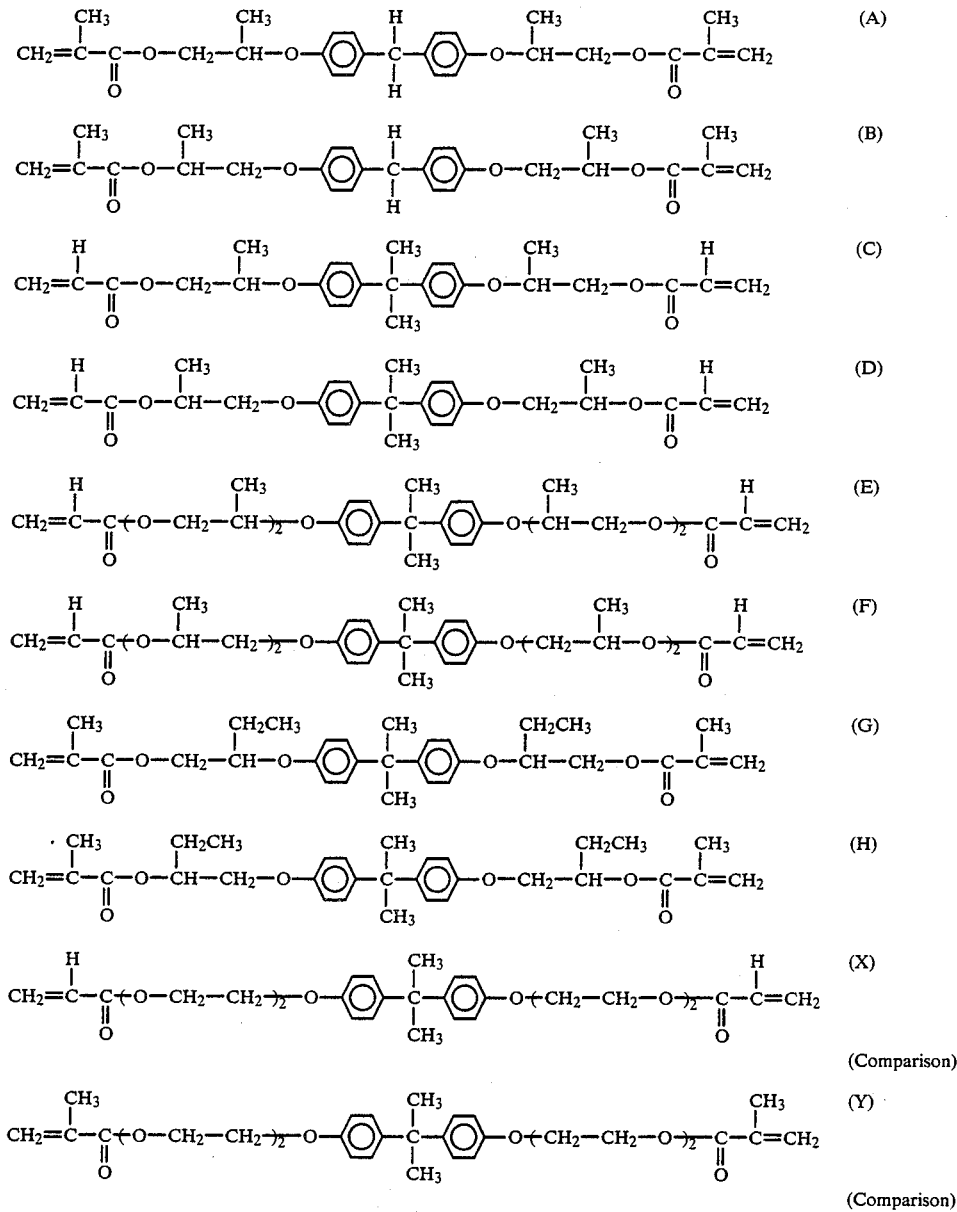

Ultraviolet-curable resin compositions were prepared by mixing the photopolymerization initiator and other additives as listed in Table 1. Using these ultraviolet-curable resin compositions for forming a primer layer, optical discs were formed.

Various properties of cured resin products were measured as follows:

(1) Moisture Resistance:

A sample (optical disc) was allowed to stand in water at 60° C. for 1000 hours and a water absorption rate was measured according to JIS K6911. The moisture resistance was evaluated by both the water absorption rate and shape stability of grooves on a metal-made recording film. The shape stability of grooves was measured by allowing a sample to stand in a water at 60° C. for 1000 hours. The shape stability was judged as follows: X deformed and not suitable for practical use and O hardly deformed and bearable for practical use.

(2) Heat Resistant Temperature:

A sample (optical disc) was allowed to stand at a predetermined temperature for 1000 hours to measure a practically bearable temperature at which the height and shape of grooves of depressions and protuberances on a metal-made recording film hardly change. Generally speaking, the temperature of about 110° C. is necessary.

(3) Light Transmittance:

A resin plate of 1 mm thick was formed and the light transmittance of the resin plate with a light of 830 nm was measured by using a spectrophotometer.

(4) Tensile Strength:

A cured resin product was subjected to a tensile test according to JIS k6911 in order to give a measure for judging mechanical strength of optical discs bearable for high-speed revolution of 500 rpm or more.

(5) Adhesive Properties:

After allowing an optical disc to stand in water at 60° C. for 1000 hours, or after heating at 110° C. for 1000 hours, adhesiveness between the resin and a transparent substrate made from glass or a transparent plastic (e.g. epoxy resin, acrylic resin) was evaluated with the mark O (no problem in practical use) and the mark X (there is a problem in practical use).

The optical discs used for measuring the properties (1), (2) and (5) mentioned above were produced as follows.

Figure 7:
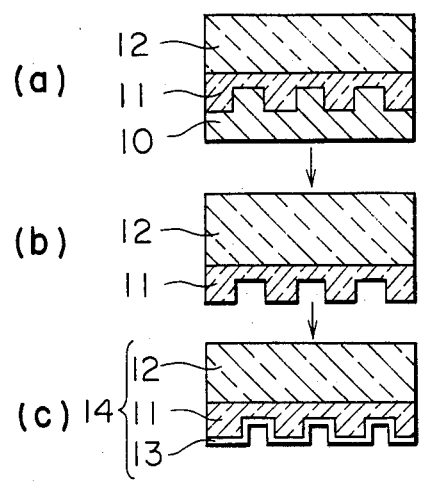
FIGS. 7(a) to 7(c) are cross-sectional views showing a process for producing an optical disc base plate having a substrate and a primer layer according to this invention.

An ultraviolet-curable resin composition was inserted into a space formed between a stamper 10 made of nickel having grooves and pits thereon and a transparent substrate 12 made of glass plate having a diameter of 300 mm and a thickness of 1.2 mm as shown in FIG. 7(a) and pressed at 10 g/cm$^2$, followed by curing with ultraviolet irradiation from the transparent substrate side at 150 mW/cm$^2$ (wavelength: 365 nm) for 30 seconds using a high-pressure mercury lamp to form a primer layer 11. Then, the stamper 10 was removed as shown in FIG. 7(b) to give precise replicas of the grooves and pits of the stamper on the primer layer 11 (the cured resin composition). On the surfaces of grooves and pits of the primer layer 11, a recording film 3 of Te series was formed by a vacuum deposition method in the thickness of about 250 Å as shown in FIG. 7(c) to give a optical disc base plate 14.

Figure 8:
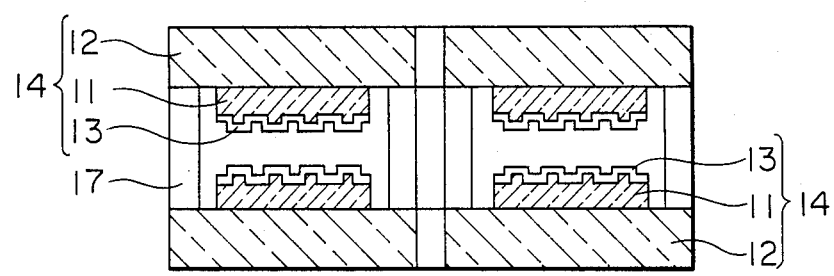
FIG. 8 is a cross-sectional view of an optical disc produced by the process shown in FIGS. 7(a) to 7(c).

Two optical disc base plates 14 were placed oppositely so as to face the recording films each other as shown in FIG. 8 with a distance of about 5 mm using spacers 17, which were bonded to the transparent substrates 12 made of glass plate using an epoxy resin adhesive (not shown in FIG. 8) to give an optical disc.

Table 1 shows compositions of the resin compositions and Table 2 shows properties measured by the above-mentioned methods.

TABLE 1

| Run No. | Example | | | | | | | | | | | | | | | Comparison | | | | | |
|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 |
| Resin (A) | 100 | — | — | — | — | — | — | — | — | — | — | — | — | — | — | — | — | — | — | — | — |
| Resin (B) | — | 100 | — | — | — | — | — | — | — | — | — | — | — | — | — | — | — | — | — | — | — |
| Resin (C) | — | — | 100 | — | — | — | — | — | — | — | — | — | — | — | — | — | — | — | — | — | — |
| Resin (D) | — | — | — | 100 | — | — | — | — | — | — | — | — | — | — | — | — | — | — | — | — | — |
| Resin (E) | — | — | — | — | 100 | — | — | — | 80 | — | 50 | 80 | — | 40 | 100 | — | — | — | — | — | — |
| Resin (F) | — | — | — | — | — | 100 | — | — | — | 80 | 50 | — | 80 | 40 | — | — | — | — | — | — | — |
| Resin (G) | — | — | — | — | — | — | 100 | — | — | — | — | — | — | — | — | — | — | — | — | — | — |
| Resin (H) | — | — | — | — | — | — | — | 100 | — | — | — | — | — | — | — | — | — | — | — | — | — |
| Resin (X) (Comparison) | — | — | — | — | — | — | — | — | — | — | — | — | — | — | — | 100 | — | 80 | — | 100 | — |
| Resin (Y) (Comparison) | — | — | — | — | — | — | — | — | — | — | — | — | — | — | — | — | 100 | — | 80 | — | 100 |
| 1,6-Hexanediol dimethacrylate*[1] | — | — | — | — | — | — | — | — | 20 | 20 | — | — | — | — | — | — | — | 20 | 20 | — | — |
| 1,10-Decanediol dimethacrylate*[1] | — | — | — | — | — | — | — | — | — | — | — | 20 | 20 | 20 | — | — | — | — | — | — | — |
| 1-Hydroxycyclohexylbenzophenone*[2] | 2 | 2 | 2 | 2 | 2 | 2 | 2 | 2 | 2 | 2 | 2 | 2 | 2 | 2 | 2 | 2 | 2 | 2 | 2 | 2 | 2 |
| γ-Methacryloxypropyltrimethoxysilane*[3] | — | — | — | — | — | — | — | — | — | — | — | — | — | — | 1 | — | — | — | — | 1 | 1 |

(Note)
*[1]: Methacrylate monomer for lowering the viscosity.
*[2]: Photopolymerization initiator
*[3]: Silane coupling agent

TABLE 2

| | Example | | | | | | | | | | |
|---|---|---|---|---|---|---|---|---|---|---|---|
| Run No. | 1 | 2 | 3 | 4 | 5 | 6 | 7 | 8 | 9 | 10 | 11 |
| Moisture resistance | | | | | | | | | | | |
| Water absorption rate (%) | 0.5 | 0.6 | 0.5 | 0.7 | 0.6 | 0.7 | 0.5 | 0.6 | 0.5 | 0.6 | 0.5 |
| Shape stability of grooves of metal film | o | o | o | o | o | o | o | o | o | o | o |
| Heat resistant temp. (°C.) | 112 | 110 | 115 | 111 | 110 | 112 | 113 | 110 | 112 | 110 | 111 |
| Light transmittance (830 nm) (%) | 85 | 88 | 90 | 88 | 85 | 90 | 85 | 86 | 87 | 84 | 85 |

TABLE 2-continued

| | | | | | | | | | | |
|---|---|---|---|---|---|---|---|---|---|---|
| Tensile strength (MPa) | 47 | 46 | 48 | 46 | 47 | 46 | 45 | 48 | 47 | 48 | 45 |
| Adhesive properties | o | o | o | o | o | o | o | o | o | o | o |

| | Example | | | | Comparison | | | | | |
|---|---|---|---|---|---|---|---|---|---|---|
| Run No. | 12 | 13 | 14 | 15 | 16 | 17 | 18 | 19 | 20 | 21 |
| Moisture resistance | | | | | | | | | | |
| Water absorption rate (%) | 0.7 | 0.7 | 0.6 | 0.7 | 1.3 | 1.4 | 1.5 | 1.4 | 1.6 | 1.7 |
| Shape stability of grooves of metal film | o | o | o | o | x | x | x | x | x | x |
| Heat resistant temp. (°C) | 113 | 114 | 111 | 110 | 108 | 109 | 110 | 108 | 110 | 111 |
| Light transmittance (830 nm) (%) | 86 | 90 | 88 | 86 | 85 | 84 | 86 | 87 | 88 | 87 |
| Tensile strength (MPa) | 46 | 48 | 47 | 48 | 46 | 48 | 47 | 45 | 47 | 48 |
| Adhesive properties | o | o | o | o | o | o | o | o | o | o |

As is clear from Table 2, Run Nos. 16 to 21 wherein resin components outside of the claimed range of this invention are use are poor in the moisture resistance compared with Run Nos. 1 to 15 according to this invention.

EXAMPLE 2

Using ultraviolet-curable resin compositions as listed in Table 3, optical discs were produced in the same manner as described in Example 1. Properties of cured resin products and the optical discs were measured in the same manner as described in Example 1 and shown in Table 3.

As is clear from Table 3, the ultraviolet-curable resin compositions within the claimed range show excellent properties when optical discs are produced by using these resin compositions.

TABLE 3

| | Example | | | | |
|---|---|---|---|---|---|
| | 22 | 23 | 24 | 25 | 26 |
| Run No. | | | | | |
| Resin (A) | 50 | 30 | — | 30 | 20 |
| Resin (B) | — | — | 30 | — | — |
| Resin (C) | 50 | 30 | — | 20 | 20 |
| Resin (D) | — | — | 40 | — | — |
| Resin (E) | — | 40 | — | 30 | 20 |
| Resin (F) | — | — | 30 | — | — |
| Resin (G) | — | — | — | 20 | 20 |
| Resin (H) | — | — | — | — | 20 |
| 1-Hydroxycyclohexyl-benzophenone*2 | 2 | 2 | 2 | 2 | 2 |
| Properties | | | | | |
| Moisture resistance | | | | | |
| Water absorption rate (%) | 0.6 | 0.5 | 0.7 | 0.6 | 0.5 |
| Shape stability of grooves of metal film | o | o | o | o | o |
| Heat resistant temp (°C) | 110 | 112 | 111 | 113 | 112 |
| Light transmittance (830 nm) (%) | 88 | 87 | 89 | 85 | 89 |
| Tensile strength (MPa) | 48 | 46 | 47 | 48 | 46 |
| Adhesive properties | o | o | o | o | o |

(Note)
*2: Photopolymerization initiator.

EXAMPLE 3

Using the same ultraviolet-curable resin compositions (Run Nos. 1 to 21) as used in Example 1, optical discs having a structure as show in FIG. 10 were produced as follows.

Figure 9:
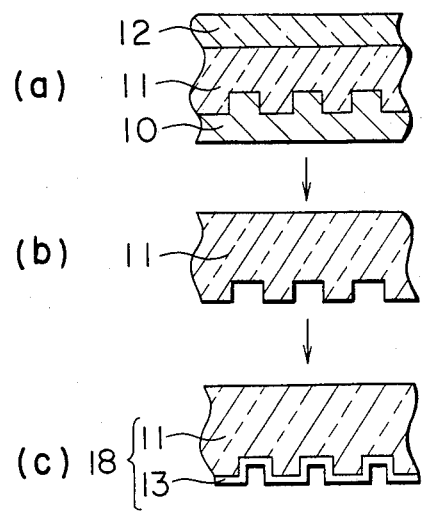
FIGS. 9(a) to 9(c) are cross-sectional views showing a process for producing an optical disc base plate having an integrated substrate and primer layer according to this invention.

A ultraviolet-curable resin composition was inserted into a space formed by placing in parallel a stamper 10 made of nickel having grooves and pits thereon, and a tramsparent glass plate 12 (120 mm in diameter and 3 mm in thickness) previously release treated by coating methylhydrodienepolysiloxane and heating it at 150° C. for 1 hour, with a distance of 1.3 mm, as shown in FIG. 9(a), followed by curing with ultraviolet irradiation from the transparent glass plate side at 80 mW/cm² (wavelength: 365 nm) for 60 seconds using a high-pressure mercury lamp to cure the resin composition. Then the metal-made stamper 10 and the transparent glass plate 12 were taken off to give a transparent resin substrate 11 having precise replicas of the grooves and pits of the stamper on one surface thereof and obtained by curing the ultravioletcurable resin composition of about 1.2 mm thick as shown in FIG. 9(b). On the surfaces of grooves and pits of the resin substrate 11, a recording film 13 of Te series was formed by a vacuum deposition method in the thickness of about 250 Å as shown in FIG. 9(c) to give an optical disc base plate 18.

Figure 10:
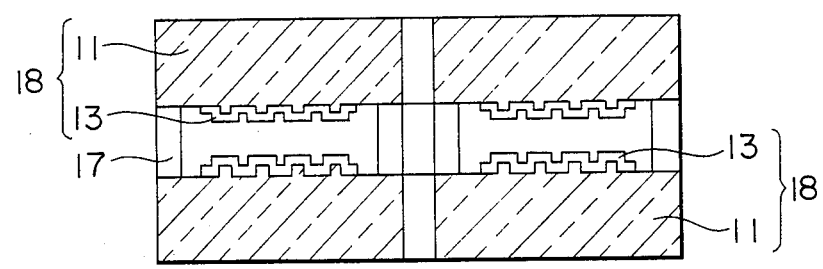
FIG. 10 is a cross-sectional view of an optical disc produced by the process shown in FIGS. 9(a) to 9(c).

Two optical disc base plates 18 were placed oppositely so as to face the recording films each other as shown in FIG. 10 with a distance of about 5 mm using spacers 17, which were bonded to the optical disc base plates 18 using an epoxy resin adhesive (not shown in FIG. 10) to give an optical disc.

Using the resulting optical discs, preperties thereof were tested in the same manner as described in Example 1. The results were the same as those shown in Table 2 (except for the item of "adhesive properties" because of integrated formation of a transparent substrate and a primer layer).

As mentioned above, by using the cured resin composition as the primer layer according to this invention, there can be obtained optical disc base plates with high sensitivity, high density and high reliability.

What is claimed is:

1. An optical disc base plate comprising a transparent substrate, a primer layer formed on the substrate and having depressions and protuberances for carrying information signals, and a recording film formed on the primer layer, said primer layer being obtained by curing with ultraviolet light irradiation an ultraviolet-curable resin composition comprising at least one compound selected from the compounds of the formulae:

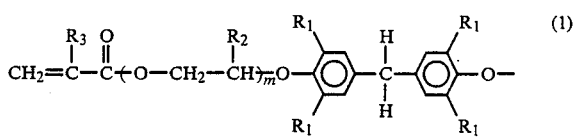

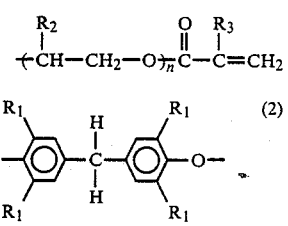

-continued

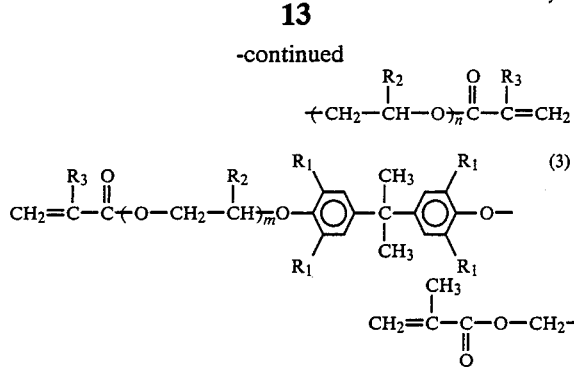

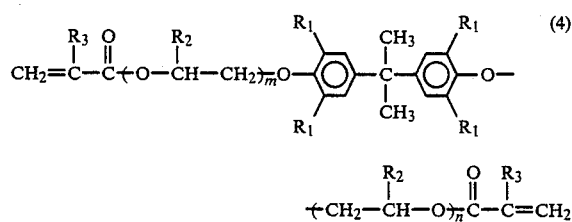

wherein $R_1$ is hydrogen or a halogen; $R_2$ is an alkyl group having 1 to 12 carbon atoms; $R_3$ is hydrogen or a methyl group; m and n are independently an integer of 1 to 4, and a photopolymerization initiator.

2. An optical disc base plate according to claim 1, wherein the photopolymerization initiator is used in an amount of 0.01 to 5 parts by weight based on 100 parts by weight of the compounds of the formulae (1) to (4).

3. An optical disc base plate according to claim 1, wherein the compound of the formula (1) is

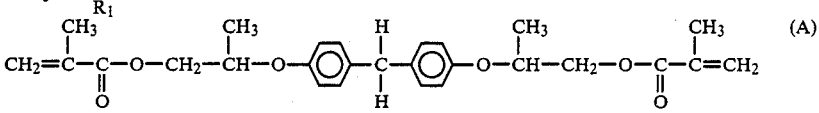

the compound of the formula (2) is

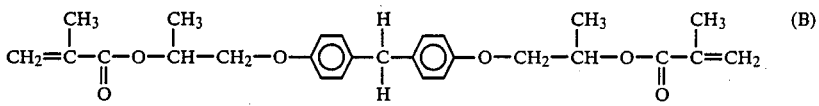

the compound of the formula (3) is

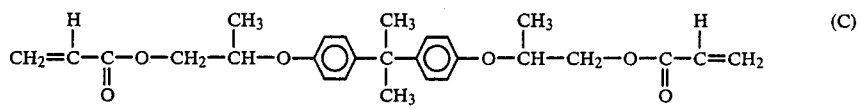

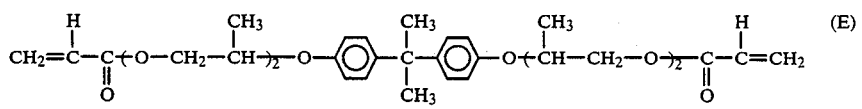

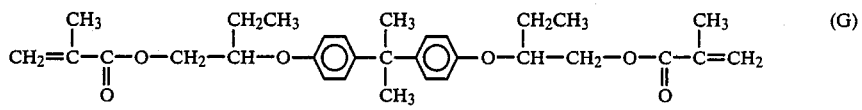

or a mixture thereof, the compound of the formula (4) is

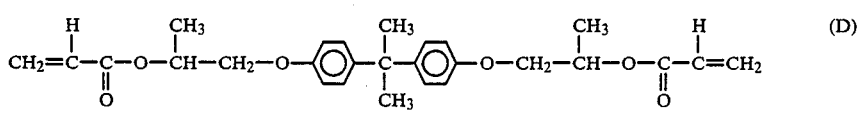

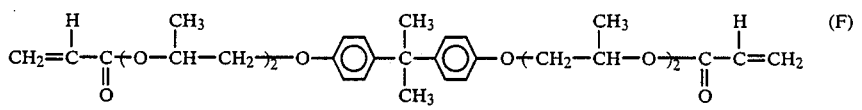

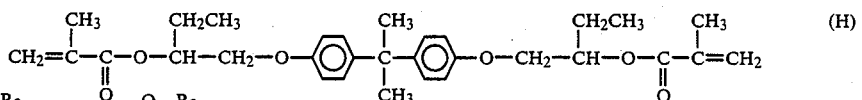

and

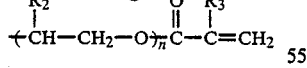

or a mixture thereof.

4. An optical disc base plate comprising a transparent resin substrate having depressions and protuberances for carrying information signals, and a recording film formed on the resin substrate, said resin substrate being obtained by curing with ultraviolet light irradiation a ultraviolet-curable resin composition comprising at least one compound selected from the compounds of the formulae:

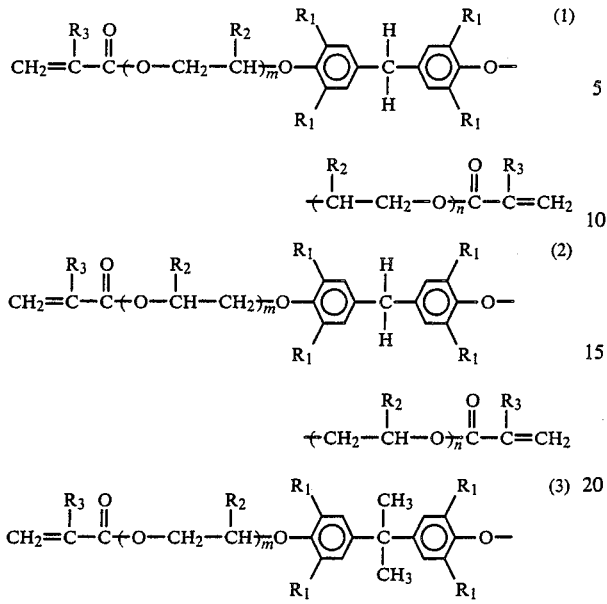
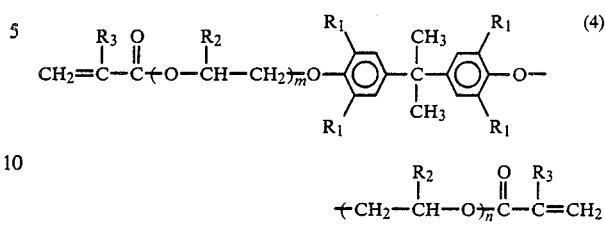

wherein $R_1$ is hydrogen or a halogen; $R_2$ is an alkyl group having 1 to 12 carbon atoms; $R_3$ is hydrogen or a methyl group; m and n are independently an integer of 1 to 4, and a photopolymerization initiator.

5. An optical disc base plate according to claim 4, wherein the photopolymerization initiator is used in an amount of 0.01 to 5 parts by weight based on 100 parts by weight of the compounds of the formulae (1) to (4).

6. An optical disc base plate according to claim 4, wherein the compound of the formula (1) is.

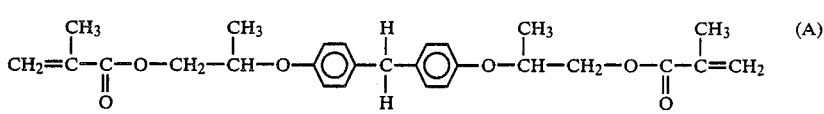

the compound of the formula (2) is

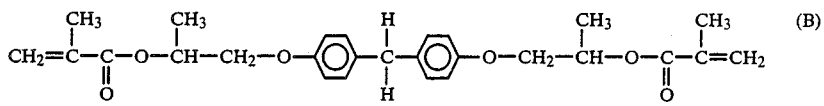

the compound of the formula (3) is

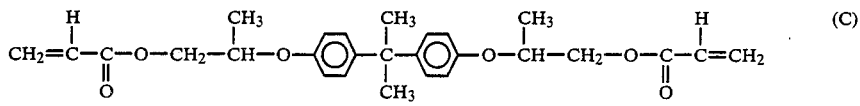

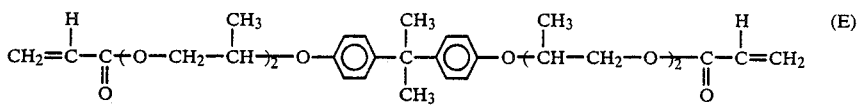

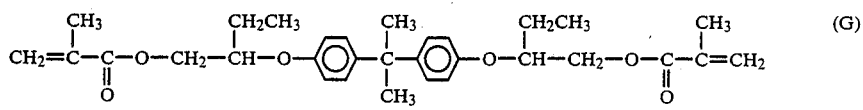

or a mixture thereof, the compound of the formula (4) is

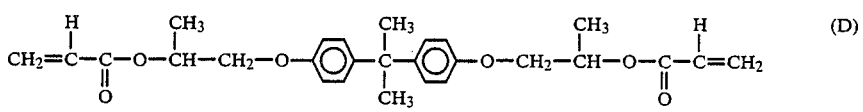

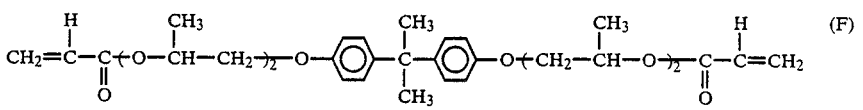

-continued

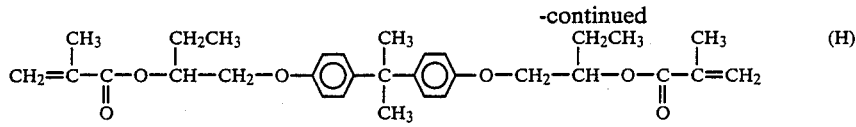

or a mixture thereof.

7. An optical disc base plate according to claim 1, wherein the ultraviolet-curable resin composition is cured by irradiation of ultraviolet light at 50 to 400 mW/cm².

8. An optical disc base plate according to claim 4, wherein the ultraviolet-curable resin composition is cured by irradiation of ultraviolet light at 50 to 400 mW/cm².

9. An optical disc base plate according to claim 1, wherein the ultraviolet-curable resin composition further comprises at least one monomer selected from the group consisting of lauryl acrylate, lauryl methacrylate, tridecyl methacrylate, isobornyl acrylate, isobornyl methacrylate, neopenthyl glycol diacrylate, neopentyl gylcol dimethacrylate, trimethylolethane triacrylate, trimethylolethane trimethacrylate, trimethylolpropane triacrylate, trimethylolpropane trimethacrylate, 1,6-hexanediol dimethacrylate, and 1,10-decanediol dimethacrylate, in an amount of 0 to 40 parts by weight based on 100 parts by weight of the at least one compound.

10. An optical disc base plate according to claim 9, wherein said ultraviolet-curable resin composition further comprises a silane coupling agent selected from the group consisting of γ-acryloxypropyltrimethoxysilane, γ-methacryloxypropyltrimethoxysilane, vinyltrimethoxysilane, vinyltriethoxysilane, and N-β-(N-vinylbenzylamino)ethyl-γ-aminopropyltrimethoxysilane monohydrogenchloride in an amount of 0 to 6.0 parts by weight based on 100 parts by weight of the at least one compound.

11. An optical disc base plate according to claim 4, wherein the ultraviolet-curable resin composition further comprises at least one monomer selected from the group consisting of lauryl acrylate, lauryl methacrylate, tridecyl methacrylate, isobornyl acrylate, isobornyl methacrylate, neopenthyl glycol diacrylate, neopentyl gylcol dimethacrylate, trimethylolethane triacrylate, trimethylolethane trimethacrylate, trimethylolpropane triacrylate, trimethylolpropane trimethacrylate, 1,6-hexanediol dimethacrylate, and 1,10-decanediol dimethacrylate, in an amount of 0 to 40 parts by weight based on 100 parts by weight of the at least one compound.

12. An optical disc base plate according to claim 11, wherein said ultraviolet-curable resin composition further comprises a silane coupling agent selected from the group consisting of γ-acryloxypropyltrimethoxysilane, γ-methacryloxypropyltrimethoxysilane, vinyltrimethoxysilane, vinyltriethoxysilane, and N-β-(N-vinylbenzylamino)ethyl-γ-aminopropyltrimethoxysilane monohydrogenchloride in an amount of 0 to 6.0 parts by weight based on 100 parts by weight of the at least one compound.

13. An optical disc base plate according to claim 3, wherein said primer layer is obtained by curing with ultraviolet light irradiation the compound of the formula (E).

14. An optical disc base plate according to claim 3, wherein said primer layer is obtained by curing with ultraviolet light irradiation the compound of the formula (F).

15. An optical disc base plate according to claim 6, wherein said primer layer is obtained by curing with ultraviolet light irradiation the compound of the formula (E).

16. An optical disc base plate according to claim 6, wherein said primer layer is obtained by curing with ultraviolet light irradiation the compound of the formula (F).

* * * * *